United States Patent
Giraldo et al.

(10) Patent No.: US 6,558,725 B2
(45) Date of Patent: May 6, 2003

(54) METHOD AND APPARATUS FOR PREPARING SLICED PLANTAINS

(75) Inventors: Javier Libardo Arango Giraldo, Medellin (CO); Lillian Regina Juranovic, Miami, FL (US)

(73) Assignee: Recot, Inc., Pleasanton, CA (US)

(*) Notice: Subject to any disclaimer, the term of this patent is extended or adjusted under 35 U.S.C. 154(b) by 0 days.

(21) Appl. No.: 09/929,981

(22) Filed: Aug. 15, 2001

(65) Prior Publication Data

US 2003/0035872 A1 Feb. 20, 2003

(51) Int. Cl.[7] .............................. A23L 1/00; B26D 1/00
(52) U.S. Cl. ........................ 426/438; 83/663; 83/932; 99/404; 99/537; 426/518; 426/615
(58) Field of Search .................. 426/438, 506, 426/518, 615; 99/536, 537, 404; 83/663, 932

(56) References Cited

U.S. PATENT DOCUMENTS 6,148,702 A 11/2000 Bucks
6,148,709 A 11/2000 Bucks
6,413,566 B2 * 7/2002 Caridis et al. .............. 426/506

* cited by examiner

Primary Examiner—George C. Yeung
(74) Attorney, Agent, or Firm—Colin P. Cahoon; Carstens, Yee & Cahoon, LLP (57) ABSTRACT

The present invention overcomes many of the shortcomings inherent in previous methods and systems addressing the commercial production of fried plantain slices. The improved process comprises a fully automated system which includes a sprayer assembly adapted to continually spray the cutting knife mechanism on commercial-grade slicing machines with a cleansing lubricant thereby keeping the cutting surface clean and free of debris. The improved system also includes a liquid bath for coating the freshly sliced plantains prior to immersion in a hot oil frying vat. In one embodiment, the system utilizes an edible oil as both the cleansing spray lubricant and in the liquid bath. In this embodiment, the liquid bath serves as a reservoir for the cleansing lubricant sprayer assembly. In another embodiment, the system utilizes water as both the cleansing spray lubricant and in the liquid bath.

37 Claims, 6 Drawing Sheets

(PRIOR ART)

*Fig. 2b*

(PRIOR ART)

METHOD AND APPARATUS FOR PREPARING SLICED PLANTAINS

BACKGROUND OF THE INVENTION

1. Technical Field

The present invention generally relates to the processing of plantains, and more specifically, to an improved apparatus and method for slicing and processing plantains in the preparation of a fried sliced food product.

2. Description of the Related Art

Known as "potatoes of the air" or simply as "cooking bananas," plantains have been cultivated for thousands of years throughout Southeast Asia and Africa. From tropical Africa, the fruit was taken aboard ships bound for Europe and eventually made its way to the New World with Portuguese and Spanish navigators. Evidence suggests the Spanish introduced plantains to the Island of Hispanola (today the Dominican Republic and Haiti) during the 1500s where the favorable tropical climate nurtured production. Today, plantains are a staple food source in parts of Africa, southern India, and throughout the Caribbean, Central and South America.

The plantain is a member of the banana family. While closely related to the common banana, the edible fruit of the plantain has more starch than the banana and is not eaten raw. Plantains are starchy when ripe and are often used in tropical regions in place of potatoes and squashes. Because the plantain has a maximum of starch before it ripens, it is usually cooked green. It may also be dried for later use in cooking or ground for use as a meal.

Culinary techniques for preparing plantains are long practiced and include roasting, boiling, stewing, mashing, and frying. Recipes for frying sliced plantains abound in recipe books the world over. Typically, plantains are fried while they are unripened and green. The plantains are peeled and cut either into thin slices, or sliced in half and cut lengthwise. An edible oil (e.g., rice oil, hardened palm or coconut oil) is heated in a pan or skillet and the plantain slices are placed therein and fried until golden brown. The plantain slices are thereupon removed from the hot oil and served with a spicy sauce or sprinkled with powdered sugar.

Commercial production of fried sliced plantains, however, gives rise to several inherent problems. Current commercial production techniques still include numerous workers manually slicing plantains by moving plantains over a slicing slit located on a table above a vat of frying oil. While commercial-grade, high volume slicing machines presently exist and are well known in the art, they are not well suited to handling sticky products such as plantains. The sticky makeup or composition of plantains tends to clog the cutting mechanism of current commercial-grade slicing machines. The cutting knife mechanisms utilized in automated commercial-grade slicing machines must be cleaned repeatedly during a production cycle requiring a production line to be shut down frequently. Additionally, the sliced raw plantains tend to stick to one another. Upon being immersed in hot oil, they tend to clump together rather than cook as individual slices thereby causing uneven cooking and unattractive visual presentation.

A variety of proposals have previously been made to address the commercial processing of plantains into a fried sliced foodstuff. For example, U.S. Pat. No. 4,242,365 to Numata et al. describes a process wherein banana slices are fried in a reduced pressure environment to reduce the moisture content of the banana slices thereby producing a dried banana product having flavor, a crisp texture and good storage stability. While providing a novel frying process, the Numata et al. '365 process does not address the previously specified problems inherent with the commercial preparation of raw plantains.

U.S. Pat. No. 4,740,381 to Bermejo, describes a process for preparing plantains wherein the core of a plantain slice is removed prior to a precooking step whereupon the plantain slice is briefly immersed in hot vegetable oil. The resulting precooked plantain slice is then smashed or flattened by a flattening device 40. The opening formed by removal of the plantain's core is used to position the plantain slice over a guiding tubular member 50 which is aligned with a cylindrical rod 60 which is centered and attached onto flattening device 40. The resulting product is then frozen. While providing a novel process for precooking and preparing plantain slices, the Bermejo '381 process does not address the previously specified problems inherent with the commercial preparation of raw plantains.

A need, therefore, exists for an improved and more comprehensive process for the commercial preparation of fried plantain slices. Further, a need exists for an improved apparatus and method for slicing plantains to overcome problems inherent in the constituent make-up of the plantain fruit. A need also exists for an improved apparatus and method which prevents or minimizes the clumping or sticking together of plantain slices prior to their immersion in frying oil.

SUMMARY OF THE INVENTION

The present invention overcomes many of the shortcomings inherent in previous methods and systems addressing the commercial production of fried plantain slices. The improved process comprises a fully automated system which includes a sprayer device adapted to continually spray the cutting knife mechanism on a commercial-grade slicing device with a cleansing lubricant thereby keeping the cutting surface clean and free of debris. The improved system also includes a liquid bath stage wherein the freshly sliced plantains are coated and immersed in a liquid medium to prevent the slices from sticking to one another prior to their immersion in the hot oil frying vat.

In one embodiment, the system utilizes an edible oil as both the cleansing spray lubricant and the liquid medium in the liquid bath. The liquid bath tank serves as a reservoir for the cleansing lubricant sprayer device. Upon exiting the sprayer mechanism onto the cutting knife mechanism, the cleansing lubricant is drained into the liquid bath tank where it is subsequently recirculated to the sprayer mechanism via a filtering device.

In another embodiment, the system utilizes water as the cleansing spray lubricant and the liquid medium in the liquid bath. In this embodiment, no filtering device is required as fresh water is constantly used as the cleansing spray lubricant and the resulting waste water is drained away from the cutting and slicing areas. Likewise the liquid bath can be drained and refilled with fresh water as necessary.

In another embodiment, the system utilizes a citric acid solution as the cleansing spray lubricant and water as the liquid medium in the liquid bath. In this embodiment, the citric acid waste water solution is drained away from the cutting and slicing areas and the liquid bath is continually drained and refilled with fresh water, as necessary, to cleanse the sliced plantains of the citric acid solution prior to their immersion in the hot oil frying vat.

Thus, in accordance with one feature of the invention, the cutting blade mechanism of commercial-grade slicing machines are continually cleaned and lubricated.

In accordance with another feature of the invention, individual plantain slices are coated with a lubricant spray further facilitating their free and unobstructed passage through the cutting mechanism and inhibiting their inherent tendency to clump together.

In accordance with another feature of the invention, individual plantain slices are immersed in a liquid bath further inhibiting their inherent tendency to clump or stick together.

In accordance with another feature of the invention, the manpower required to commercially produce fried plantain slices is greatly reduced.

In accordance with another feature of the invention, the consistency and quality of the finished commercially produced fried plantain product is improved and enhanced.

Thus, the present invention provides an improved and more comprehensive process for the commercial preparation of fried plantain slices. Further, the present invention provides an improved apparatus and method for slicing plantains to overcome problems inherent in the constituent make-up of the plantain fruit. Finally, the present invention provides an improved apparatus and method which prevents or minimizes the clumping or sticking together of plantain slices prior to their immersion in frying oil.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

Where used in the various figures of the drawing, the same numerals designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the invention.

DETAILED DESCRIPTION OF THE INVENTION

Figure 1A:
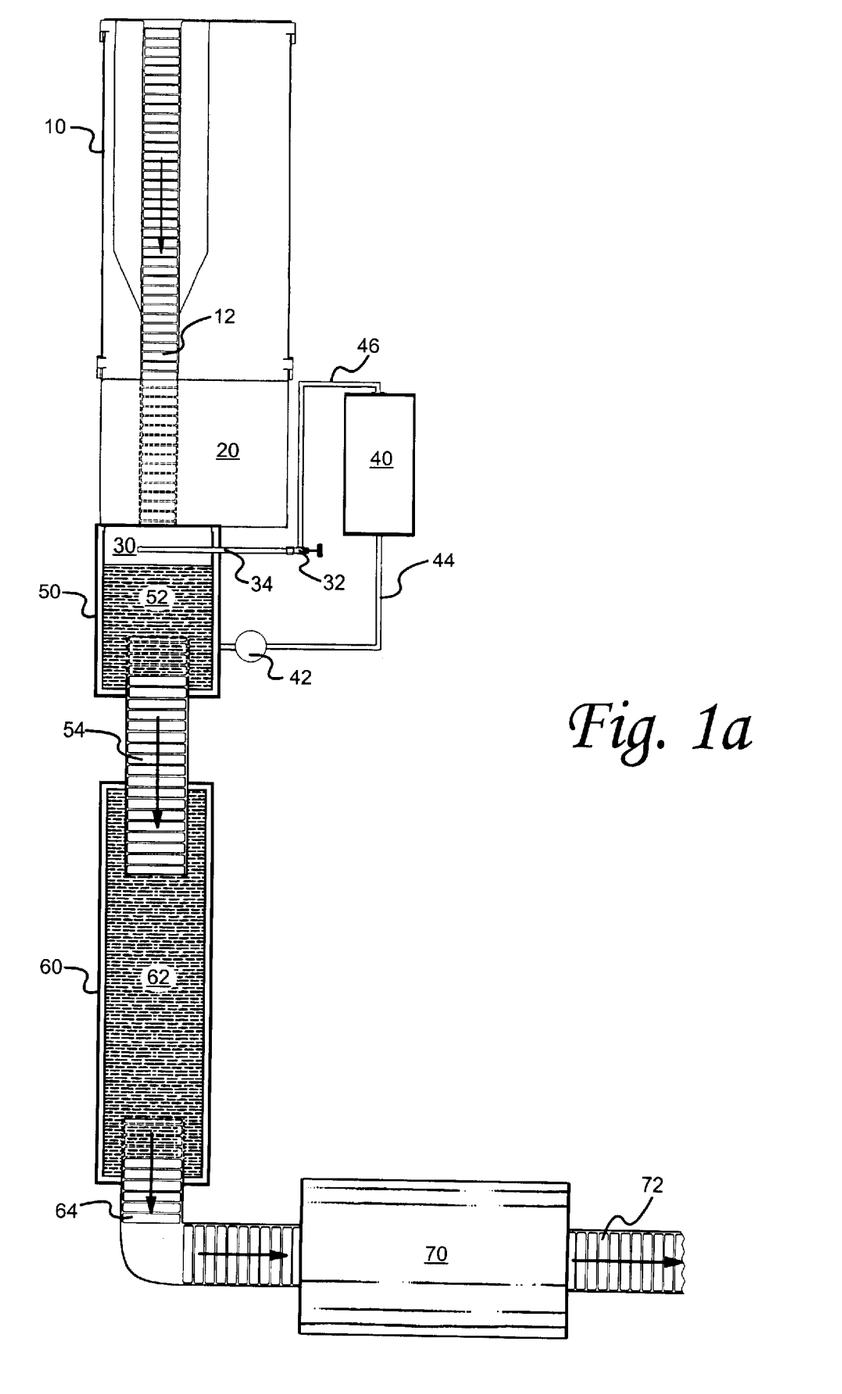
FIG. 1a is an overall view illustrating schematically the basic elements of one embodiment of the apparatus of the present invention.

In accordance with the method and apparatus of the present invention, FIG. 1a illustrates schematically an overview of the basic elements of the system. A commercial-grade cutting machine 10 is provided which comprises a first conveyor means 12 for advancing plantains through a cutting compartment 20 and into a sprayer compartment 30 which empties into a liquid bath tank 50. A pump 42 is provided to circulate the liquid medium 52 from the liquid bath tank 50 to a sprayer assembly 34 within the sprayer compartment 30 via a filtering device 40 and sprayer supply line 35. A second conveyor means 54 is provided to transport the coated plantain slices from the liquid bath tank 50 to a hot oil fryer vat 60. Upon exiting the hot oil fryer vat 60 via a third conveyor means 64, the fried plantain slices proceed to a tumbler 70 wherein seasoning is added and dispersed. Upon exiting the tumbler 70, the fried plantain slices proceed via a fourth conveyor means 72 to final inspection and bagging in accordance with methods common and well known in the industry.

Figure 1B:
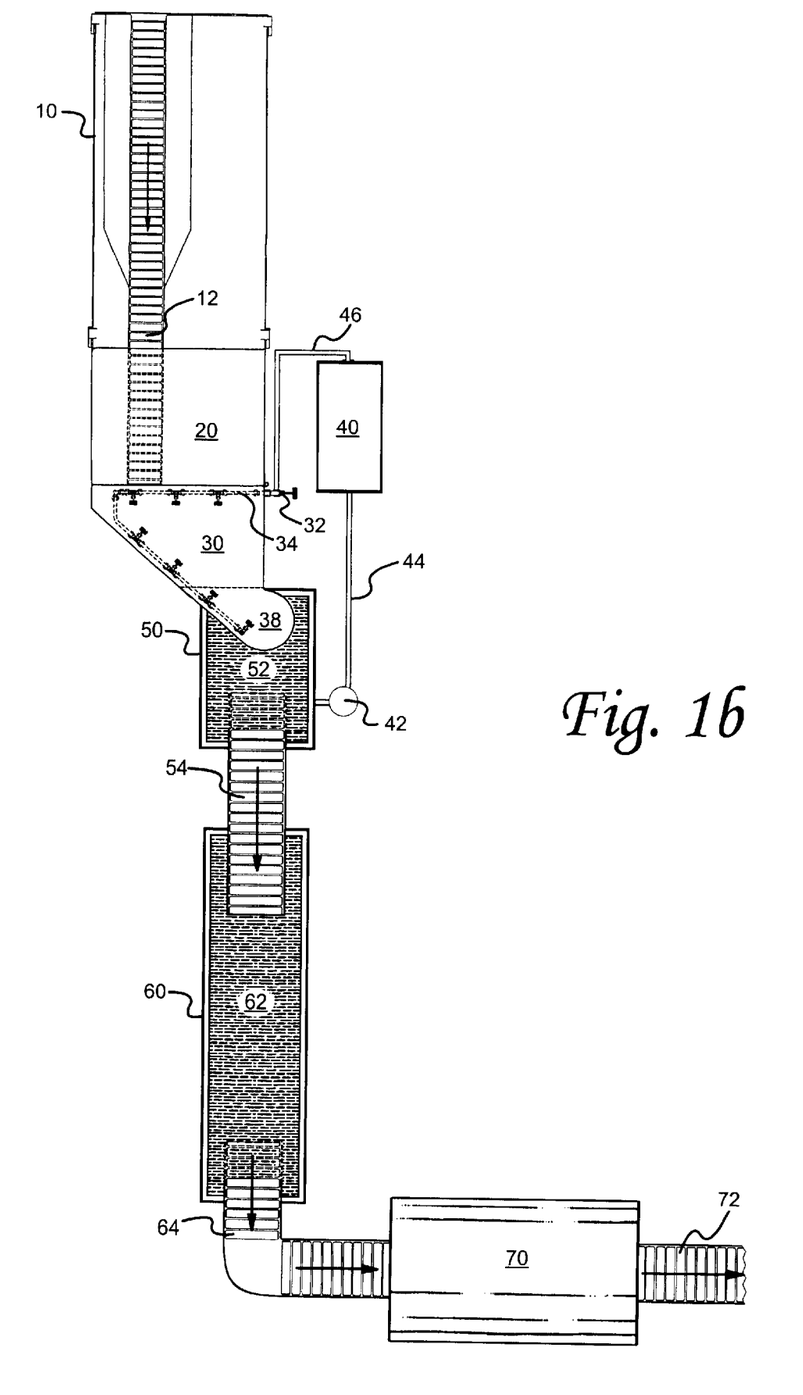
FIG. 1b is an overall view illustrating schematically the basic elements of an alternative embodiment of the apparatus of the present invention.

FIG. 1b illustrates an alternative embodiment of the apparatus of the present invention. Due to the mechanics of one variant of the cutting mechanism, which will be discussed below, the embodiment schematically illustrated in FIG. 1b also includes an expanded sprayer compartment wherein the sliced plantains are directed to an exit chute 38 which empties into the liquid bath tank 50. It will be noted that all other aspects of the two embodiments illustrated in FIGS. 1a and 1b are essentially the same.

The cutting machine 10 may be any of several commercial-grade vegetable slicing machines modified in accordance with the present invention. The cutting machine 10 may be realized in modified versions of the URSCHEL® Model OC and Model OV Slicer machines. The cutting machine 10 includes a first conveyor means 12 capable of transporting the plantain from an input area to the cutting compartment 20. In one embodiment, all conveyor means comprise variable speed conveyor belt mechanism.

The process is initiated by an operator placing a peeled plantain upon the first conveyor means 12 generally orienting the plantain's approximate longitudinal axis with the conveyor means 12 translational axis as indicated by arrow a. The first conveyor means 12 then transports the plantain to the cutting compartment 20. Generally, any type of plantain or member of the banana family may be used. While unripe or green plantains are generally preferred, the method and process also accommodates yellow or ripe plantains.

The interior of the cutting compartment 20 may be arranged in two basic configurations: wherein the cutting device is oriented perpendicular to the translational axis of the conveyor means, or wherein the cutting device is oriented at an oblique angle to the translational axis of the conveyor means.

Figure 2A:
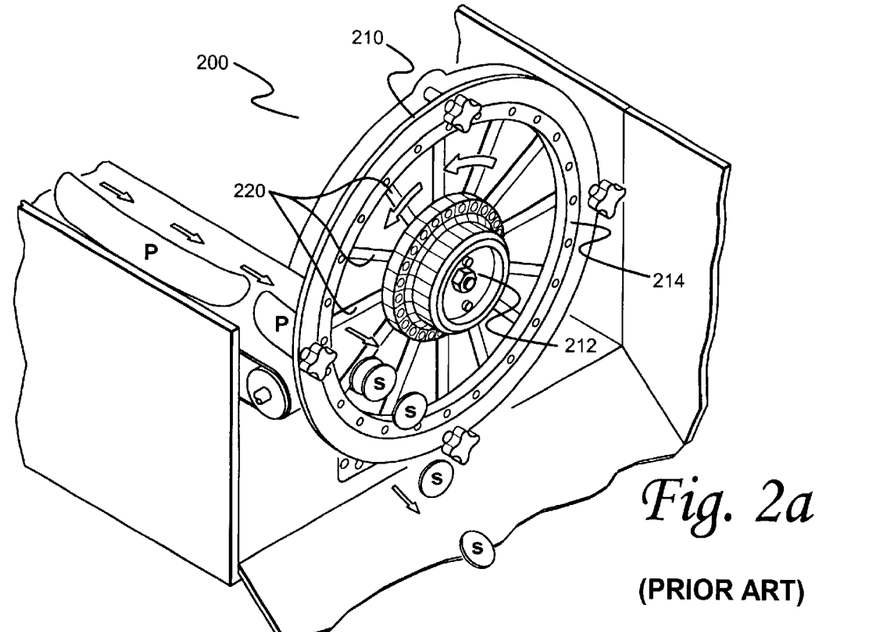
FIGS. 2a and 2b are perspective views of alternative embodiments of current cutting mechanisms found in commercial-grade slicing machines.
Figure 2B:
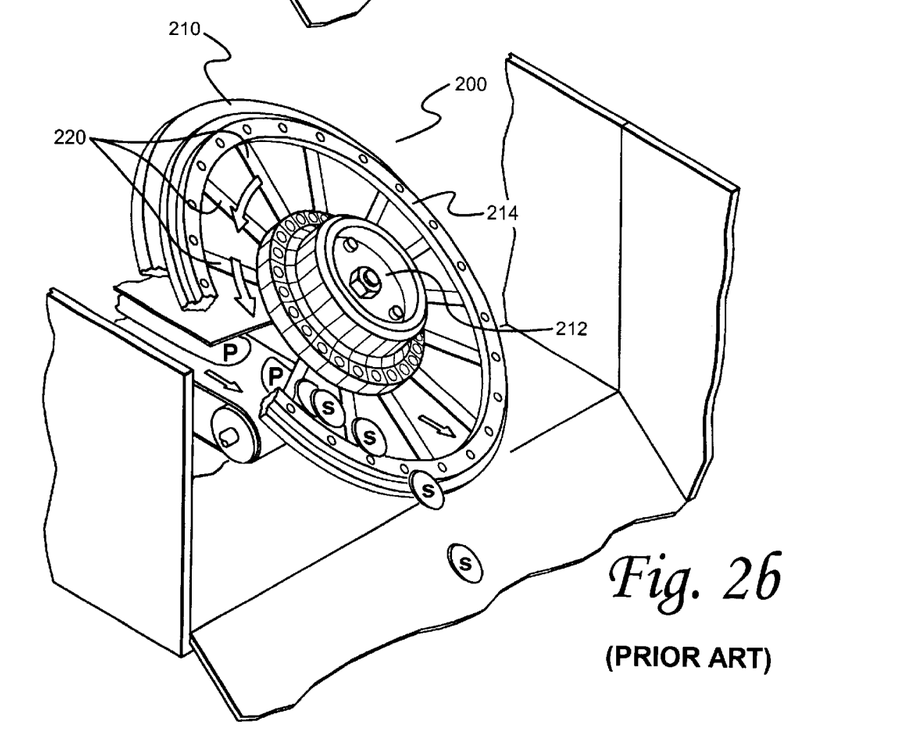

In the prior art embodiments illustrated in FIGS. 2a and 2b, the cutting device comprises a cutting mechanism 200 that includes a frame assembly 210, a hub 212 and outer rim assembly 214 supporting a plurality of cutting knife elements 220. Hub 212 is connected via attachment means to a motor means (not shown) capable of rotating cutting mechanism 200 in a counter-clockwise direction. As the cutting mechanism 200 is rotated, the individual cutting knife elements 220 pass through the extended translational axis of the conveyor means in a repetitive sequence. Thus, as plantain P, whose approximate longitudinal axis is generally oriented with the conveyor means' translational axis, is transported via the conveyor means, the plantain P is drawn through the cutting mechanism 200. The individual cutting knife elements 220 slice the plantain P at calibrated intervals based upon the translational speed of the conveyor means and the rotational speed of the cutting mechanism 200. The thickness of a plantain slice S may be varied based upon the number and size of cutting knife elements 220, the translational speed of the conveyor means, and the rotational speed of cutting mechanism 200.

Additionally, the orientation and configuration of the cutting device within the cutting compartment 20 also affects the shape of the individual plantain slice S. A cutting device oriented perpendicular to the translational axis of the conveyor means, as shown in FIG. 2a, results in an essentially round plantain slice S, whereas a cutting device oriented at an oblique angle to the translational axis of the conveyor means, as shown in FIG. 2b, results in a more elongated, oval shaped plantain slice S.

The cutting mechanism 200 illustrated in FIGS. 2a and 2b may be realized in the designs disclosed in U.S. Pat. Nos. 6,148,702 and 6,148,709 to Bucks, and incorporated into the URSCHEL® Model OC and Model OV Slicer machines. However, while the designs disclosed in the Bucks '702 and '709 invention are satisfactory alternatives for the cutting mechanism 200 of the present invention, they are not well suited to handling inherently sticky substances such as plantains. The freshly cut plantain slices tend to stick to and between the cutting knife elements 220 of the Bucks '702 and '709 invention requiring frequent stoppages for cleaning. In commercial applications, the requirement for frequent stoppages for cleaning adversely affects the rate of production. Thus, a critical modification of the cutting mechanism as disclosed in the Bucks '702 and '709 device, or the like, is in order.

The device of the present invention addresses the problem of freshly cut plantain slices sticking to the cutting mechanism by including a sprayer compartment wherein a cleaner/lubricant solution is constantly applied to the plantains and the cutting mechanism. The sprayer compartment 30 includes a sprayer assembly comprised of a sprayer supply line, which provides fluid to a plurality of sprayer elements and means for directing the plantain slices into the liquid bath tank 50. The sprayer assembly is, in turn, fluidly connected a cleaner/lubricant solution supply.

Figure 3A:
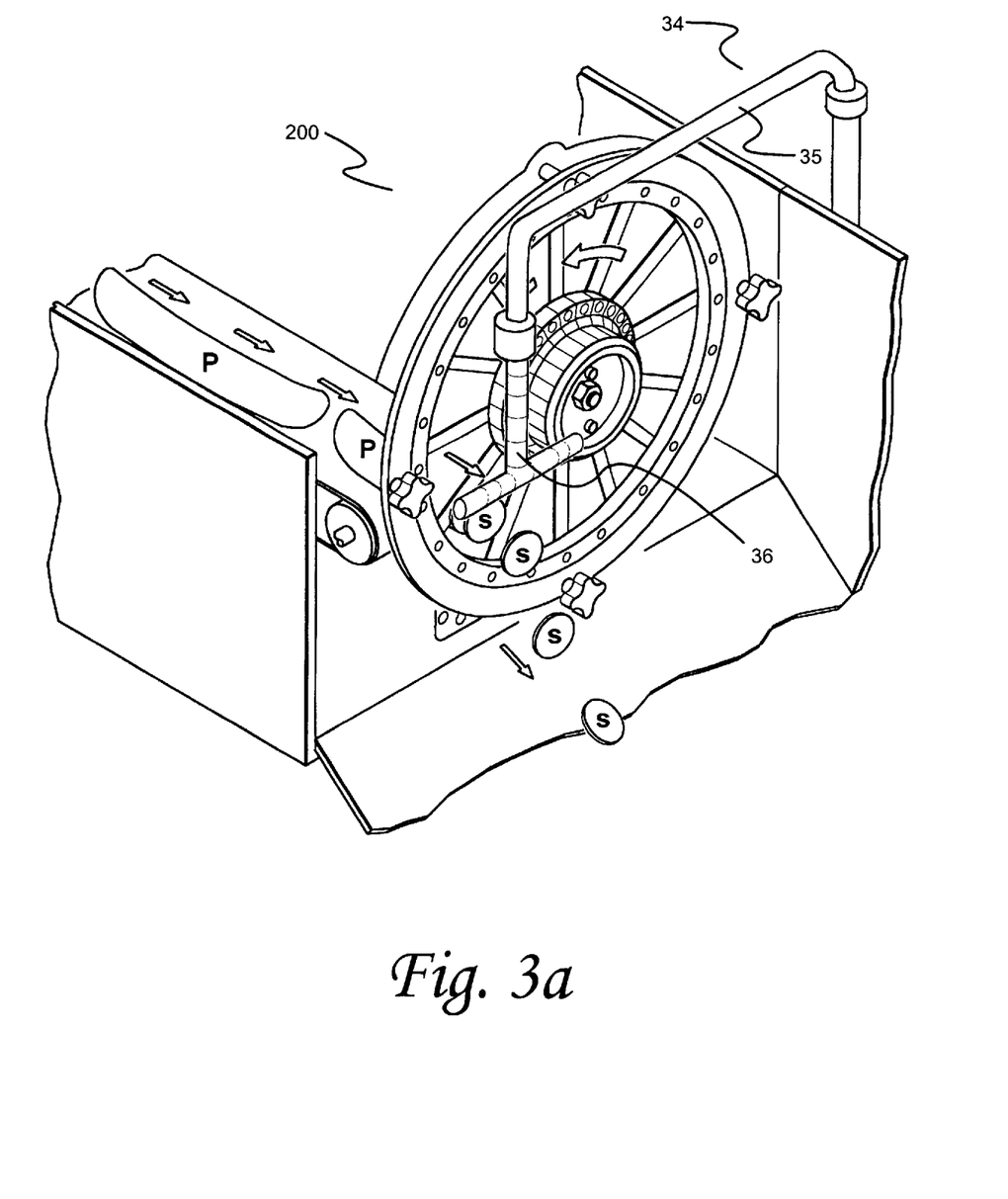
FIGS. 3a and 3b are perspective views of alternative embodiments of the sprayer device of the present invention.

Referring to FIGS. 1a and 3a, in an embodiment utilizing a cutting device oriented perpendicular to the translational axis of the first conveyor means 12, the sprayer compartment 30 includes a sprayer assembly 34 comprised of a sprayer supply line 35 which provides cleaner/lubricant solution to an inverted 'T' sprayer element 36 which includes a plurality of nozzle apertures (not shown) directed at the exit face of cutting mechanism 200. In this embodiment, the means for directing the freshly cut plantain slices into the liquid bath tank 50 is comprised of the walls of the sprayer compartment 30 which, as shown in FIG. 1a, opens directly over the liquid bath tank 50. As a plantain slice S exits the cutting mechanism 200, the force of gravity compels the slice to drop through the opening in the bottom of the sprayer compartment 30 and into the liquid bath tank 50. Should the momentum of the cutting action propel a plantain slice S, so as to momentarily overcome the force of gravity, the slice S will impact the wall of the sprayer compartment 30 facing the exit face of the cutting mechanism 200 and thereafter be deflected into the liquid bath tank 50. The sprayer assembly 34 is, in turn, fluidly connected via valve 32 to a cleaner/lubricant solution supply line 46.

Figure 3B:
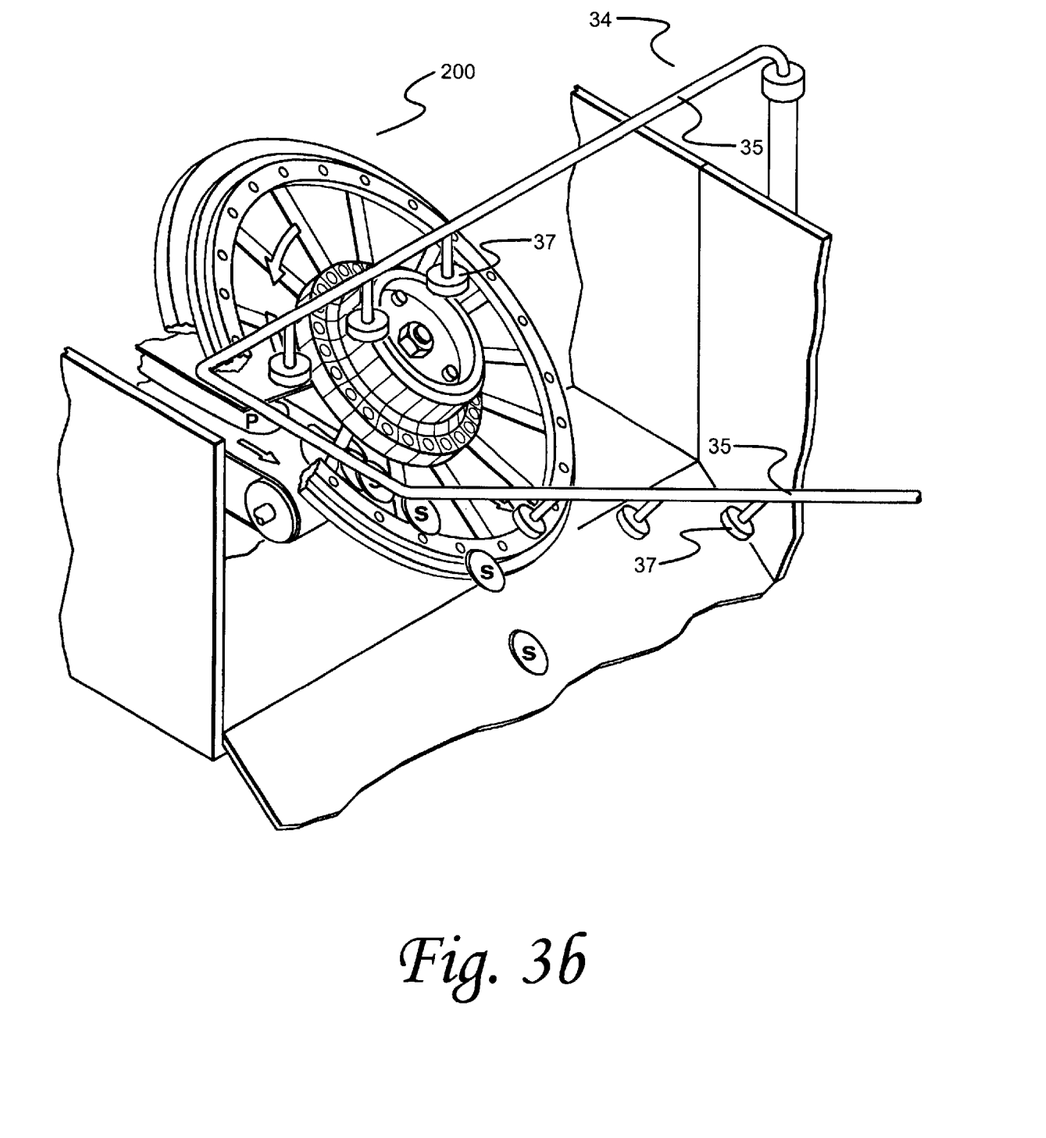
Figure 3C:
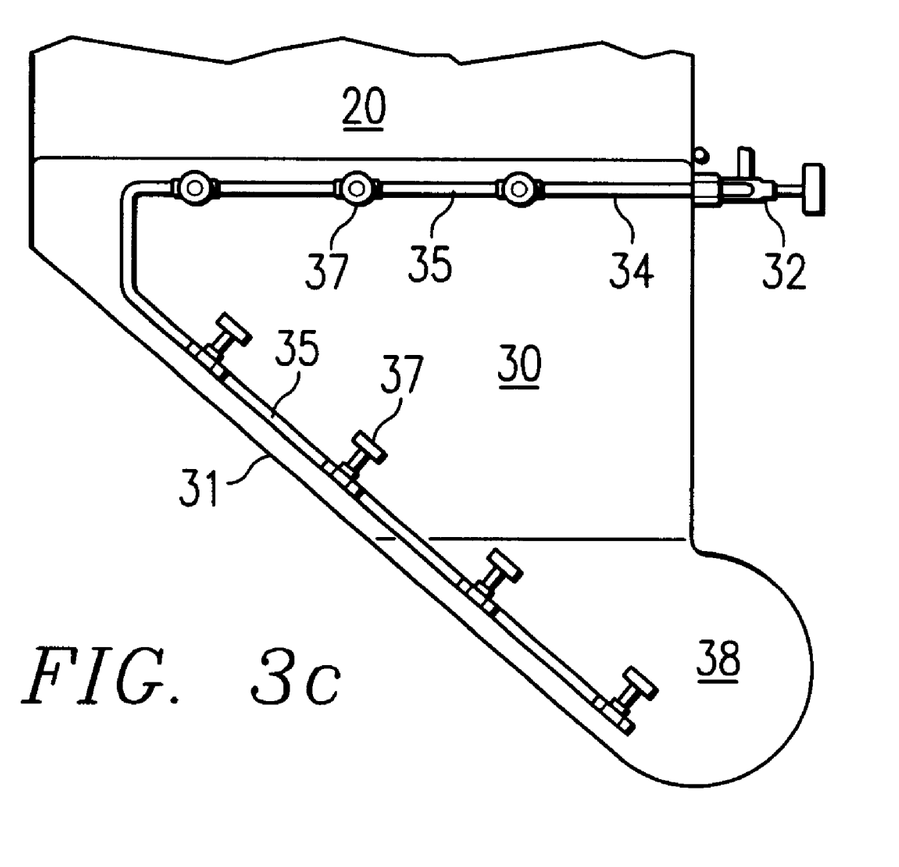
FIG. 3c is an overhead plan view of the embodiment of the spray device of the present invention shown in FIG. 3b.

Referring to FIGS. 1b, 3b and 3c, in an embodiment utilizing a cutting device oriented at an oblique angle to the translational axis of the first conveyor means 12, the sprayer compartment 30 includes a sprayer assembly 34 comprised of a sprayer supply line 35 which provides cleaner/lubricant solution to a plurality of spray nozzle elements 37 placed at strategic positions along the length of line 35 and means for directing the plantain slices S to the exit chute 38 which empties into liquid bath tank 50. In this embodiment, the means for directing the plantain slices is the vertical sidewall 31 of the sprayer compartment 30. The spray nozzle elements 37 are positioned directly above the cutting mechanism 200 and along the trajectory path of the freshly sliced plantain slices S to create a smooth flow through exit chute 38 which opens directly over the liquid bath tank 50. Sprayer assembly 34 is, in turn, fluidly connected via valve 32 to a cleaner/lubricant solution supply line 46.

With regard to the plurality of nozzle apertures included in the inverted 'T' sprayer element 36 and spray nozzle elements 37 mentioned above, while many commonly known, commercially available spray nozzle devices may be utilized a SpiralJet® model HHSJ-316-45030 will suffice. In a preferred embodiment, the use of accessory spray nozzle devices is dispensed with completely and the sprayer assembly 34 is comprised simply of perforated stainless steel tubing to avoid periodic obstruction of the nozzle elements. Typically, the sprayer assembly operates at an operating pressure of approximately 40 to 50 psi and a flow rate of approximately 30 gallons of cleaner/lubricant solution per minute.

A number of liquid solutions may be used as a cleaner/lubricant solution in conjunction with the sprayer assembly 34 in the sprayer compartment 30. In all cases, the temperature of the cleaner/lubricant solution is maintained within the optimum range of room temperature to 50° C. While satisfactory results may be achieved by using cleaner/lubricant solutions at higher temperatures, the optimum temperature range of ambient to 50° C. ensures that certain liquid mediums are not overly stressed, thereby avoiding oxidation as much as possible.

In one embodiment, an edible vegetable oil (e.g., refined palm oil) is used as the cleaner/lubricant solution and the liquid medium 52 in the liquid bath tank 50. In such an embodiment, the liquid bath tank 50 may also serve as a reservoir for the edible vegetable oil supplied to the sprayer assembly 34 in the sprayer compartment 30. Oil is siphoned from the liquid bath tank 50 via a pump 42 through a line 44 to a filtering device 40 wherein the oil is filtered of impurities. The filtered oil is then relayed via the cleaner/lubricant solution supply line 46 to a valve 32, which is fluidly connected to the sprayer assembly 34. Once dispersed into the sprayer compartment 30, the edible vegetable oil is allowed to drain back into the liquid bath tank 50 where it will be subsequently recirculated. The filtering device 40 may comprise a sieve-type device with mechanical movement similar to a filtering apparatus currently used in the production of potato chips and commonly known as a "catch box." The filtering device 40 requires cleaning approximately once every four (4) production hours.

In another embodiment, plain water has been shown to be an effective cleaner/lubricant solution and the liquid medium 52 in the liquid bath tank 50. In this embodiment, no filtering device 40 is required as a continual flow of fresh water is utilized to clean and lubricate the cutting mechanism 200 and the resulting waste water is drained away from the sprayer compartment 30 either to a separate disposal drain (not shown) or directly into the liquid bath which may be continually drained and refilled with fresh water, as necessary.

In another embodiment, a citric acid solution is used as the cleaner/lubricant solution with fresh water being utilized as the liquid medium 52 in the liquid bath tank 50. Pectin inhibitors such as aqueous citric acid solutions are effective cleaner/lubricant, but precautions must be taken to prevent the aqueous citric acid solution from getting into the hot oil frying vat 60. In this embodiment, the citric acid waste water solution is drained away from the sprayer compartment 30 via a separate disposal drain (not shown) and the liquid bath tank 50 is continually drained and refilled with fresh water, as necessary, to cleanse the sliced plantains of the citric acid solution prior to their immersion in the hot oil frying vat 60. Referring once again to FIG. 1a and 1b, upon being deposited into the liquid bath tank 50 the freshly sliced plantains are immersed in a bath of liquid medium 52. The temperature of the liquid medium 52 in the liquid bath tank 50 is maintained within the optimum range of room temperature to 50° C. While satisfactory results may be achieved by maintaining the temperature of the liquid medium 52 at higher temperatures, the optimum temperature range of ambient to 50° C. ensures that certain liquid mediums are not overly stressed so as to avoid oxidation as much as possible. The immersion of the freshly sliced plantain slices in the liquid medium 52 ensures each plantain slice is thoroughly coated thereby assisting in preventing the individual slices from sticking to one another. The pumping action of the pump 42 in conjunction with the second conveyor means 54 creates turbulence in the liquid medium 52 contained within the liquid bath tank 50 which aids in directing the plantain slices to the second conveyor means 54 whereby the plantain slices are carried out of the liquid bath tank 50 and transported to the hot oil frying vat 60.

A straight-through hot oil frying vat 60 is utilized to fry the plantain slices. An edible vegetable frying oil is utilized as the frying medium 62. The frying oil is heated via conventional means common in the art (e.g., gas or electric heat exchangers). The temperature of the frying oil is maintained within the range of 60° C.–190° C., and preferably within the range of 180° C.–185° C. The amount of frying time varies from 1 to 3 minutes. Upon completion of the frying sequence the now fried plantain slices are transported via a third conveyor means 64 to a tumbler device 70 wherein flavorings (e.g., salt and spices) are added and dispersed amongst the fried plantain slices. Upon exiting tumbler device 70, the fried plantain slices are inspected and transported via a fourth conveyor means to packaging in accordance with methods and procedures common in the industry.

It will now be evident to those skilled in the art that there has been described herein an improved apparatus and method for preparing slices on a commercial basis fried plantain slices. Although the invention hereof has been described by way of a preferred embodiment, it will be evident that other adaptations and modifications can be employed without departing from the spirit and scope thereof. For example, some of the steps in the system procedure could be conducted mechanically in addition to those conducted electrically. The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. A method for preparing plantains, said method comprising the steps of:
    (a) slicing a plantain into a plurality of individual slices using a cutting device;
    (b) cleaning and lubricating said cutting device with a spray solution while slicing said plantain;
    (c) immersing said slices in a liquid medium; and
    (d) frying said slices in a hot oil fryer.
2. The method of claim 1 wherein the slicing of step (a) is generally perpendicular to the plantain's approximate longitudinal axis.
3. The method of claim 1 wherein the slicing of step (a) is at an angle generally oblique to the plantain's approximate longitudinal axis.
4. The method of claim 1 wherein the cutting device comprises a plurality of cutting knife elements.
5. The method of claim 1 wherein the spray solution is water.
6. The method of claim 1 wherein the spray solution is an aqueous solution containing a citric acid.
7. The method of claim 1 wherein the spray solution is an edible vegetable oil.
8. The method of claim 7 wherein the edible vegetable oil is a hardened palm oil.
9. The method of claim 1 wherein the spray solution is maintained at a temperature not greater than 60° C.
10. The method of claim 1 wherein the spray solution is maintained at a temperature ranging from ambient temperature to 50° C.
11. The method of claim 1 wherein the liquid medium is comprised of an edible vegetable oil.
12. The method of claim 11 wherein the edible vegetable oil is comprised of hardened palm oil.
13. The method of claim 1 wherein the liquid medium is maintained at a temperature not greater than 60° C.
14. The method of claim 1 wherein the liquid bath is maintained at a temperature ranging from ambient temperature to 50° C.
15. The method of claim 1 wherein the liquid medium is a reservoir for the spray solution.
16. The method of claim 1 wherein the step of cleaning and lubricating further comprises spraying said cutting means prior to each cut.
17. An apparatus for preparing plantains, comprising:
    (a) a cutting machine comprised of:
        (i) a cutting compartment comprising a first housing and a cutting device,
        (ii) a sprayer compartment connected to said cutting compartment comprising a second housing with an exit chute and a sprayer assembly,
        (iii) a first conveyor means having an axis of translation extending through the cutting compartment to the sprayer compartment; and
    (b) a liquid bath positioned proximate to the exit chute.
18. The apparatus of claim 17, further comprising:
    (c) a hot oil fryer;
    (d) a second conveyor means for transporting plantains from the liquid bath to the hot oil fryer;
    (e) a tumbler mechanism;
    (f) a third conveyor means for transporting plantains from the hot oil fryer to the tumbler mechanism.
19. The apparatus of claim 17 further comprising a filtering device between and fluidly communicating the liquid bath to the sprayer compartment.
20. The apparatus of claim 17 wherein the cutting device is oriented generally perpendicular to the translational axis of the first conveyor means.
21. The apparatus of claim 17 wherein the cutting device is oriented at an angle generally oblique to the translational axis of the first conveyor means.
22. The apparatus of claim 17 wherein the cutting device is a rotary cutting mechanism comprised of a wheel assembly which includes a hub and a frame assembly supporting a plurality of cutting knife elements.

23. The apparatus of claim 17 wherein the sprayer assembly disperses a cleaner/lubricant solution onto the cutting device.

24. The apparatus of claim 17 wherein the sprayer assembly disperses a water solution onto the cutting device.

25. The apparatus of claim 17 wherein the sprayer assembly disperses an aqueous solution comprised of a citric acid onto the cutting device.

26. The apparatus of claim 17 wherein the sprayer assembly disperses an edible vegetable oil onto the cutting device.

27. The apparatus of claim 17 wherein the sprayer assembly comprises a supply line having a plurality of apertures.

28. The apparatus of claim 27 wherein the plurality of apertures are each fitted with an accessory spray nozzle device.

29. The apparatus of claim 17 wherein the second housing includes directing means for guiding a plantain slice to the exit chute.

30. The method of claim 1 wherein step (b) comprises dispersing the spray solution at a pressure of at least 40 psi.

31. The method of claim 1 wherein step (b) comprises dispersing the spray solution at a pressure between 40–50 psi.

32. The method of claim 1 wherein step (b) comprises dispersing the spray solution at a flow rate of approximately 30 gallons per minute.

33. The method of claim 1 wherein step (b) comprises dispersing the spray solution at a flow rate of at least 30 gallons per minute.

34. The apparatus of claim 17 wherein the sprayer assembly is fluidly connected to the liquid bath.

35. The apparatus of claim 34 further comprising a pump fluidly connecting the sprayer assembly to the liquid bath.

36. The apparatus of claim 34 further comprising a filtering device between the sprayer assembly and the liquid bath.

37. The apparatus of claim 34 wherein the liquid bath is a reservoir for the sprayer assembly.

\* \* \* \* \*

UNITED STATES PATENT AND TRADEMARK OFFICE
CERTIFICATE OF CORRECTION

PATENT NO. : 6,558,725 B2
DATED : May 6, 2003
INVENTOR(S) : Javier Libardo Arango Giraldo and Lillian Regina Juranovic It is certified that error appears in the above-identified patent and that said Letters Patent is hereby corrected as shown below:

<u>Column 8,</u>
Line 30, change "bath" to -- medium --.

Signed and Sealed this

Second Day of September, 2003

JAMES E. ROGAN
*Director of the United States Patent and Trademark Office*